(12) United States Patent
Kawabata et al.

(10) Patent No.: US 8,328,262 B2
(45) Date of Patent: Dec. 11, 2012

(54) PICK-UP STYLE UTILITY VEHICLE WITH EXPANDABLE CARGO BED

(75) Inventors: Takao Kawabata, Kobe (JP); Kazuya Takeuchi, Kakogawa (JP); Scott F. Gordon, Lincoln, NE (US); Hirokazu Morita, Kakogawa (JP); Teruaki Yamamoto, Lincoln, NE (US); Hironori Mahara, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 393 days.

(21) Appl. No.: 12/649,796

(22) Filed: Dec. 30, 2009

(65) Prior Publication Data

US 2011/0156423 A1 Jun. 30, 2011

(51) Int. Cl.
*B62D 33/02* (2006.01)
(52) U.S. Cl. .............. 296/24.43; 296/183.1; 296/65.09
(58) Field of Classification Search .............. 296/165, 296/171, 175, 24.3, 24.33, 24.4, 24.43, 26.08, 296/62.09, 26.1, 26.11, 183.1, 183.2, 190.03, 296/191, 37.6, 64, 65.01, 66, 65.09; 280/756, 280/749
See application file for complete search history.

(56) References Cited

U.S. PATENT DOCUMENTS

| | | | |
|---|---|---|---|
| 6,478,355 B1 * | 11/2002 | Van Eden et al. | 296/37.6 |
| 6,786,535 B1 * | 9/2004 | Grzegorzewski et al. | 296/190.11 |
| 6,905,159 B1 | 6/2005 | Saito et al. | |
| 6,994,388 B2 | 2/2006 | Saito et al. | |
| 7,249,798 B2 | 7/2007 | Saito et al. | |
| 2002/0070573 A1 * | 6/2002 | Song | 296/37.6 |
| 2009/0256388 A1 * | 10/2009 | Tanaka et al. | 296/186.4 |
| 2010/0308614 A1 * | 12/2010 | Arnold | 296/37.6 |

* cited by examiner

*Primary Examiner* — Jason S Morrow
(74) *Attorney, Agent, or Firm* — Wenderoth, Lind & Ponack, LLP

(57) ABSTRACT

A pick-up style utility vehicle has a front seat, a rear seat, and a cargo bed, a cabin frame surrounding a riding space, and a screen shield partitioning the cargo bed and a rear riding space in front of the cargo bed. The cargo bed can be changed between an expanded state in which the cargo bed is expanded in a front direction into the rear riding space and a non-expanded state not occupying the rear riding space. The screen shield is directly or indirectly supported by a swinging shaft provided on a vehicle body and is swingable between a position in the expanded state and a position in the non-expanded state.

1 Claim, 13 Drawing Sheets

PICK-UP STYLE UTILITY VEHICLE WITH EXPANDABLE CARGO BED

BACKGROUND OF THE INVENTION

1. Field of the Invention

The present invention relates to a pick-up style utility vehicle which can expand a cargo bed in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicle. The pick-up style utility vehicle is used for hunting in fields and mountains, conveyance of lumber, movement in golf courses, golf course maintenance, and the like.

The present applicants have formerly applied the inventions relating to the pick-up style utility vehicle with a cargo bed whose area or capacity can be expanded. Their applications have been filed, which are, for example, U.S. Pat. Nos. 6,905,159, 6,994,388, and 7,249,798.

A configuration of the pick-up style utility vehicle disclosed in the respective documents has a front seat including a driver's seat, a rear seat, and a cargo bed in this order from front. The rear seat is changed between a used state and a retracted state to switch between 2 passengers transformation and 4 passengers transformation. In the 2 passengers transformation, a front portion of the cargo bed can be expanded to a riding space occupied by the rear seat in the used state.

Typically, a screen shield is provided at the front end of the cargo bed of the pick-up style utility vehicle so as not to move a load loaded on the cargo bed into the riding space in front of the cargo bed. The screen shield need be changed between the 2 passengers transformation expanding the cargo bed in a front direction, and the 4 passengers transformation not expanding the cargo bed.

FIG. 21 shows an example of the expandable cargo bed disclosed in the related art documents. A cargo bed 400 has a stationary bottom plate 401, right and left stationary side panels 402, a pair of right and left expandable side panels 404 provided at the front ends of the stationary side panels 402 and rotatably supported about hinge shafts 403, an expandable bottom plate 405 provided at the front end of the stationary bottom plate 401, and a front panel 406. A screen shield 407 is integrally formed with the front panel 406.

Pins 410 for positioning and fixing protruded in a downward direction are provided at the right and left ends of the screen shield 407. Pin insertion holes 411 and 412 into which each of the pins 410 of the screen shield 407 can be inserted are formed in the upper surface of the end of each of the expandable side panels 404 and the upper surface of the front end of each of the stationary side panels 402.

As indicated by the solid lines in FIG. 21, when the expandable side panels 404 are closed (4 passengers transformation), the screen shield 407 is located at the front ends of the stationary side panels 402 and the pins 410 of the screen shield 407 are inserted into the pin insertion holes 412 of the stationary side panels 402 from above. As indicated by the imaginary lines, when the expandable side panels 404 are opened in a front direction (2 passengers transformation), the screen shield 407 is located at the front ends of the expandable side panels 404 and the pins 410 of the screen shield 407 are inserted into the pin insertion holes 411 of the expandable side panels 404 from above.

With the above configuration, the screen shield 407 is moved between an expanded position when the cargo bed 400 is expanded and a non-expanded position when the cargo bed 400 is not expanded. The screen shield 407 need be lifted together with the front panel 406 to pull out the right and left pins 410 from the pin insertion holes 411 or 412. The screen shield 407 and the front panel 406 then need be integrally moved in a rear or front direction. After the movement, the pins 410 need be inserted into the pin insertion holes 412 or 411 from above again.

However, a weight of the screen shield 407 integrally having the front panel 406 is large, and a width of the screen shield 407 extends throughout the substantially whole width of the cargo bed 400. Therefore, it is very difficult to move the screen shield 407 by one person. Accordingly, at present, the screen shield 407 is lifted by grabbing the right and left ends of the screen shield 407 and the front panel 406 by two operators to pull out the pins 410. After the movement, the pins 410 need be inserted into the pin insertion holes 411 or 412 again. Thus, it takes time to move the screen shield 407.

SUMMARY OF THE INVENTION

The present invention has been made in view of the above problems and an object of the present invention is to simplify a moving operation of a screen shield with expanding and contracting operations of a cargo bed, thereby performing the operations easily and immediately even by one operator.

To achieve the above object, the present invention provides a pick-up style utility vehicle including a front seat, a rear seat, and a cargo bed in this order from front, a cabin frame surrounding a riding space, and a screen shield partitioning the cargo bed and a rear riding space in front of the cargo bed, wherein the cargo bed can be changed between an expanded state in which the cargo bed is expanded in a front direction to the rear riding space and a non-expanded state not occupying the rear riding space, and the screen shield is directly or indirectly supported by a swinging shaft provided on a vehicle body and is swingable between a position in the expanded state and a position in the non-expanded state.

With the above configuration, the position of the screen shield can be changed between the expanded position and the non-expanded position without lifting the screen shield in the expanding or contracting operation of the cargo bed. The position of the screen shield can be easily changed by one operator.

According to the present invention, preferably, the screen shield is attached to the upper end of a gate-shaped screen shield frame provided on the vehicle body so as to be swingable in a front-rear direction.

With the above configuration, the configuration in which the position of the screen shield can be changed between the expanded position and the non-expanded position can be easily formed.

According to the present invention, preferably, the upper portion of the screen shield is suspendably supported by the upper portion of the cabin frame so as to be swingable in a front-rear direction.

With the above configuration, the upper portion of the cabin frame is a supporting member of the screen shield. Thus, the screen shield is simply swingable.

According to the present invention, preferably, in the configuration in which the upper portion of the screen shield is suspendably supported by the upper portion of the cabin frame so as to be swingable in a front-rear direction, the screen shield can be changed between a position where the screen shield is suspendably supported in a down direction and a position where the screen shield is lifted to near the upper portion of the cabin frame.

With the above configuration, the screen shield is lifted to near the upper portion of the cabin frame. Thus, the screen shield can be used as the roof of the pick-up style utility vehicle.

According to the present invention, preferably, the screen shield is directly or indirectly coupled to the rear seat via a link mechanism, the rear seat is rotatable so that the rear seat becomes in a substantially horizontal state in the non-expanded state of the cargo bed and that the rear seat becomes in a substantially vertical state in the expanded state of the cargo bed, and when the rear seat is shifted between a substantially horizontal state and a substantially vertical state, the screen shield is swingable in a front-rear direction by the link mechanism.

With the above configuration, when the rear seat is rotated, the screen shield is swingable in a front-rear direction by the link mechanism. Thus, the moving operation of the screen shield can be easily performed.

DETAILED DESCRIPTION OF THE PREFERRED EMBODIMENTS

First Embodiment of the Present Invention

Figure 1:
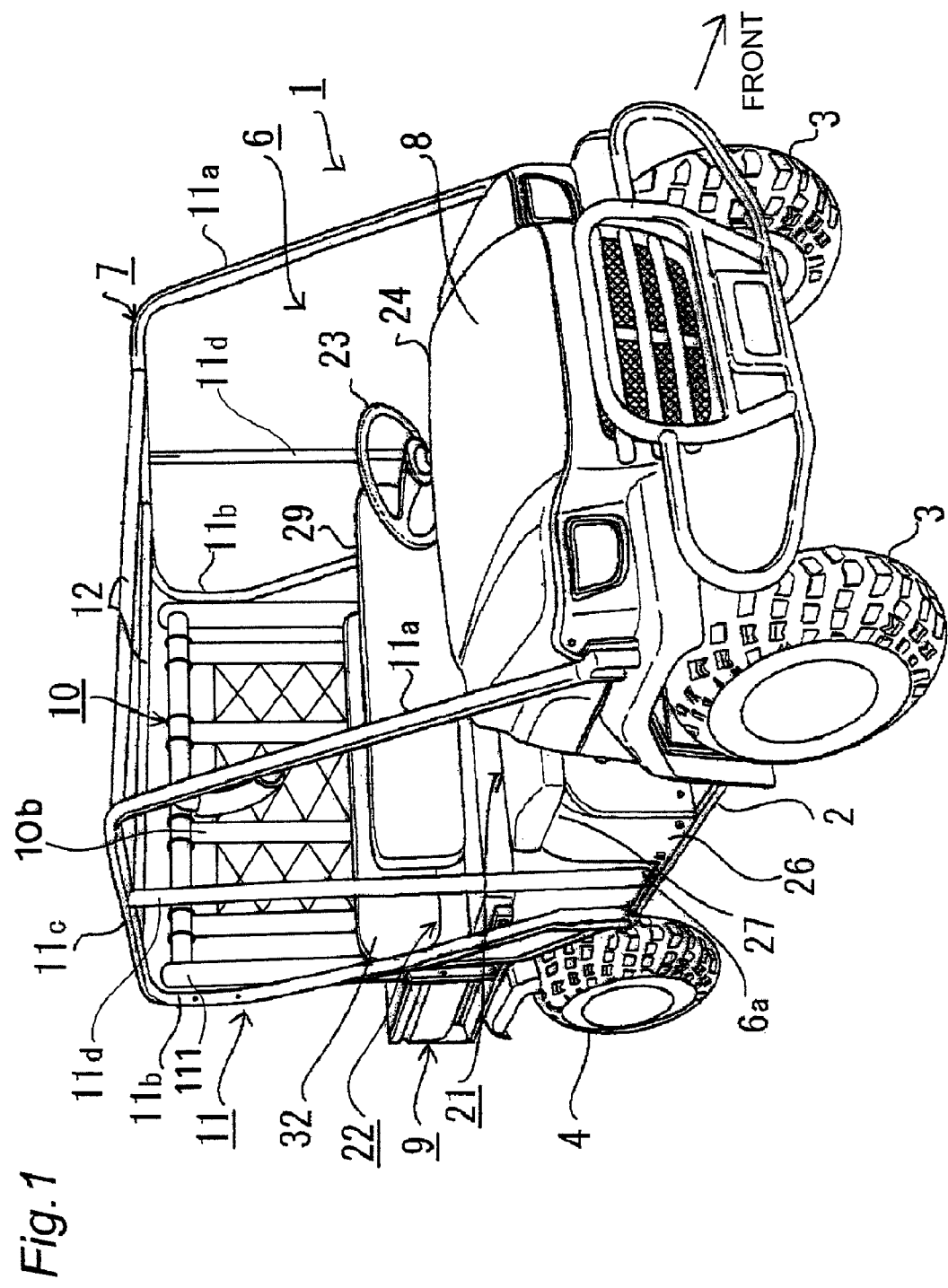
FIG. 1 is an overall perspective view of a pick-up style utility vehicle according to a first embodiment of the present invention.
Figure 2:
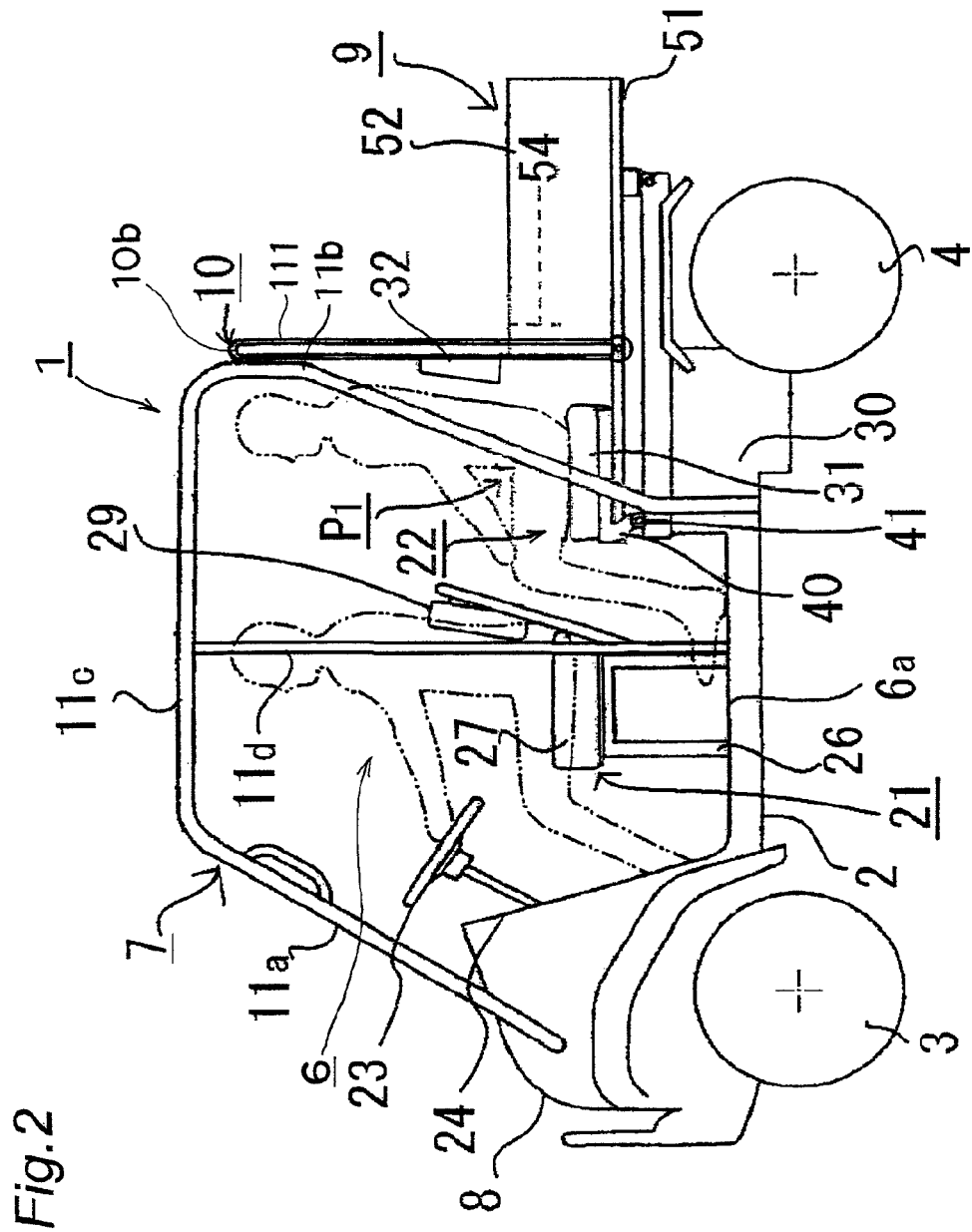
FIG. 2 is a left side view of the pick-up style utility vehicle of FIG. 1 when a cargo bed is in a non-expanded state.
Figure 3:
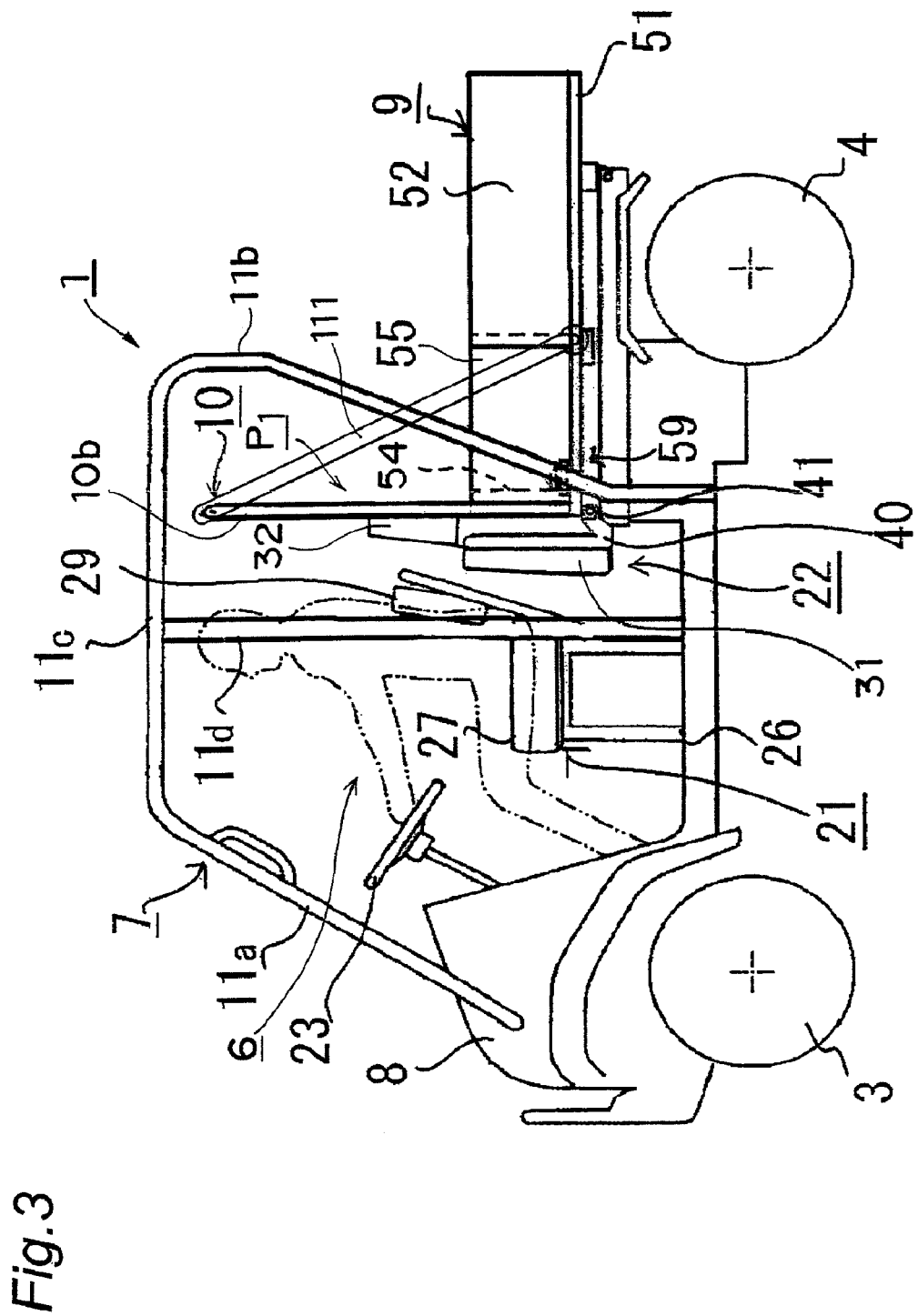
FIG. 3 is a left side view of the pick-up style utility vehicle of FIG. 1 when the cargo bed is in an expanded state.

FIGS. 1 to 4 show a pick-up style utility vehicle 1 with an expandable cargo bed according to a first embodiment of the present invention. The pick-up style utility vehicle 1 can be changed between 4 passengers transformation contracting a cargo bed 9, as shown in FIGS. 2 and 2 passengers transformation folding a rear seat 22 and expanding the cargo bed 9 in a front direction, as shown in FIG. 3. The configuration of the pick-up style utility vehicle will be described below in detail with reference to the drawings.

FIG. 1 is a perspective view of the pick-up style utility vehicle 1. The pick-up style utility vehicle 1 has a vehicle body 2 supported by the pair of right and left front wheels 3 and a pair of right and left rear wheels 4. The cabin frame 7 configuring a cabin 6 is provided in an intermediate portion above the vehicle body 2 in a front-rear direction. A hood 8 is provided in front of the cabin frame 7. The cargo bed 9 is provided behind the cabin frame 7. A screen shield 10 partitioning the cargo bed 9 and a riding space is provided at the front end of the cargo bed 9 so as to be adjustable in a front-rear direction.

The cabin frame 7 surrounding the cabin 6 has a pair of right and left side frame members 11 formed in an inverted U-shape and made of metal pipes, and a plurality of cross frame members 12 made of metal pipes coupling the side frame members 11. Each of the side frame members 11 has a front side portion 11a extended in a rear direction and in an up direction from near the right or left side portion of the hood 8, a rear side portion 11b extended in a substantially up direction from the right or left side portion at the rear end of cabin 6, an upper side portion 11c integrally coupling the upper end of the front side portion 11a and the upper end of the rear side portion 11b and extended in a front-rear direction, and an intermediate longitudinal portion 11d coupling the intermediate portion of the upper side portion 11c in a front-rear direction and a floor surface 6a.

A bench-shaped front seat 21 is installed in the front half portion of the cabin 6. A bench-shaped rear seat 22 is installed in the rear half portion of the cabin 6. A dashboard (operating portion) 24 having a steering wheel 23 and the like is provided at the front end of the cabin 6.

FIG. 2 is a left side view of the pick-up style utility vehicle 1 in the 4 passengers transformation. The bench-shaped front seat 21 has a seat leg 26 erected on the floor surface 6a of the cabin 6, a seat bottom 27 provided on the upper end face of the seat leg 26, and a backrest 29 fixed via a supporting stay on the intermediate longitudinal portions 11d. The bench-shaped front seat 21 is typically extended in a right-left direction to near the right and left ends of the cabin 6. With this configuration, two persons can be seated on the bench-shaped front seat 21 side by side. A driver can be seated on one of seating areas (left side) and a passenger can be seated on the other seating area. The bench-shaped rear seat 22 has a seat bottom 31 arranged on the upper side of a box 30 housing an engine (not shown). As in the front seat 21, the seat bottom 31 is extended in a right-left direction to near the right and left ends of the cabin 6. Therefore, two passengers can be seated on the bench-shaped rear seat 22 side by side.

The configuration of the rear seat 22 will be described in detail. The seat bottom 31 is fixed onto the upper surface of a supporting base 40. The front end of the supporting base 40 is rotatably supported at the front upper end of the box 30 via hinges 41.

FIG. 3 is a left side view of the pick-up style utility vehicle 1 in the 2 passengers transformation. The seat bottom 31 is rotated about the hinges 41 so as to become in a substantially vertical state so that the rear seat 22 becomes in a retracted state. The rear seat 22 is retracted to use a rear portion riding space P1 as the forward expanded space of the cargo bed 9.

Figure 4:
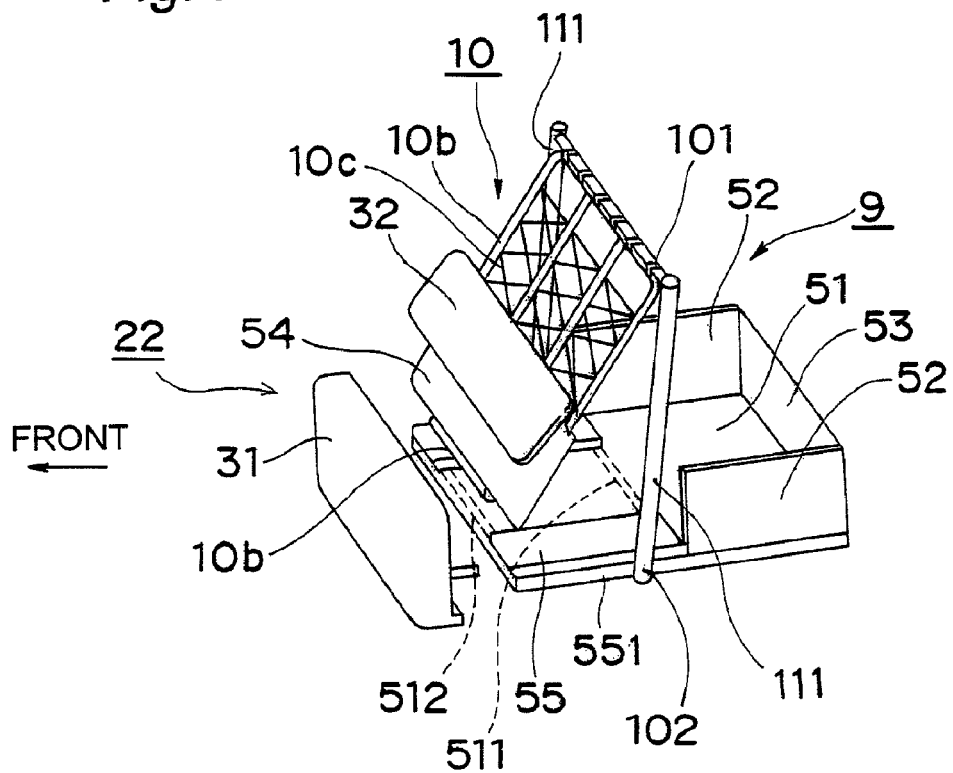
FIG. 4 is a simplified perspective view of the expandable cargo bed 9 and the screen shield 10.

The configuration of the screen shield 10 will be described in detail. FIG. 4 is a simplified perspective view of the expandable cargo bed 9 and the screen shield 10. The screen shield 10 is attached to the upper end of a gate-shaped screen shield frame 111 provided on the vehicle body 2 via hinges 101 so as to be swingable in a front-rear direction. The lower end of the screen shield frame 111 is attached to a bottom plate 51 via hinges 102 so as to be swingable in a front-rear direction. The screen shield 10 has a plurality of frame members 10b and a metal net 10c attached to the frame members 10b, while the screen shield 10 integrally has, at the lowermost ends thereof, a front panel 54 of the cargo bed 9. A backrest 32 for the passenger seating on the rear seat 22 is attached to the net 10c.

The cargo bed 9 has, as a basic configuration, the bottom plate 51, a pair of stationary side panels 52 provided substantially perpendicular to the bottom plate 51 along the right and left ends of the bottom plate 51, and an openable and closeable gate-shaped rear panel 53 provided at the rear end of the bottom plate 51. In addition to these members, to expand the cargo bed 9 in a front direction, a pair of right and left expandable side panels 55 are rotatably supported in the front portion of the bottom plate 51 via hinges 551 along the right and left ends of the bottom plate 51. The position of each of the expandable side panels 55 can be changed between a falling position (folding position) as shown in FIG. 4 and an erecting position as shown in FIG. 3.

A length in an up-down direction of the frame members 10b is expandable and contractable. A protrusion portion 10b1 at the lower ends of the frame members 10b is inserted into and fixed to the bottom plate 51. The protrusion portion 10b1 of the frame members 10b is inserted into the intermediate portion 511 or the front portion 512 in a front-rear direction of the bottom plate 51. When the protrusion portion 10b1 is inserted into the intermediate portion 511, the screen shield 10 is located in a rear direction so that the pick-up style utility vehicle is in the 4 passengers transformation in which the cargo bed 9 is in a non-expanded state. A front panel 54 of the cargo bed 9 attached to the frame members 10b is located on the intermediate portion 511. When the protrusion portion 10b1 is inserted into the front portion 512, the screen shield 10 is located in a front direction so that the pick-up style utility vehicle is in the 2 passengers transformation in which the cargo bed 9 is in an expanded state. In this case, the front panel 54 of the cargo bed 9 attached to the frame members 10b is located on the front portion 512. That is, the front panel 54 of the cargo bed 9 attached to the frame members 10b of the screen shield 10 is shifted in a front-rear direction according to the shift in a front-rear direction of the screen shield 10. As a result, the cargo bed 9 is changed between the expanded state and the non-expanded state. A fixing means of the inserted protrusion portion 10b1 to the bottom plate 51 may be of an insertion type, a hook type, or a pin type inserting pins from the right and left side panels of bottom plate 51. A length in an up-down direction of the protrusion portion 10b1 is substantially the same as the thickness of the expandable side panels 55 (corresponding to a length in an up-down direction of the expandable side panels 55 in a folded state) so as not to cause a gap between the frame members 10b and the bottom plate 51 when the protrusion portion 10b1 is inserted into the bottom plate 51.

The operation of changing the 4 passengers transformation shown in FIG. 2 to the 2 passengers transformation shown in FIG. 3 and expanding the cargo bed 9 will be described. FIGS. 5 to 9 are left side views of the portion of the screen shield 10 when the cargo bed 9 is expanded.

Figure 5:
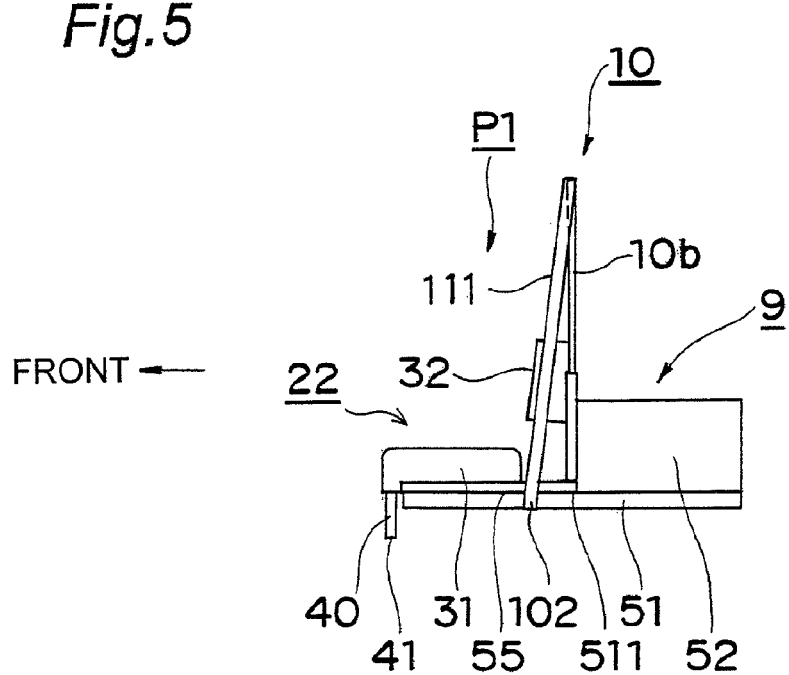
FIG. 5 is a left side view of the portion of screen shield 10 when 4 passengers transformation is changed to 2 passengers transformation.

In the 4 passengers transformation shown in FIG. 5, the seat bottom 31 of the rear seat 22 is located above the expandable side panels 55 in a folded state. The screen shield 10 is located in a position behind the seat bottom 31 and partitioning the cargo bed 9 and the rear riding space P1. The frame members 10b are inserted into and fixed to the intermediate portion 511 of the bottom plate 51.

Figure 6:
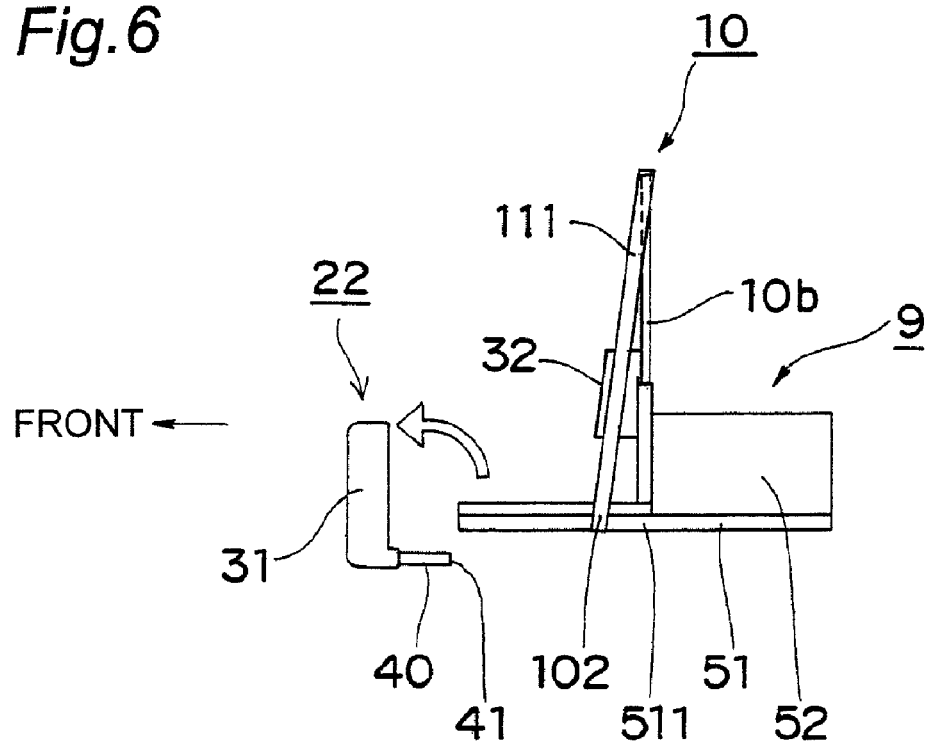
FIG. 6 is a left side view of the portion of screen shield 10 when the 4 passengers transformation is changed to the 2 passengers transformation.

When the 4 passengers transformation is changed to the 2 passengers transformation, as shown in FIG. 6, the seat bottom 31 is rotated in a front direction about the hinges 41 together with the supporting base 40 so as to become in a substantially erected state.

Figure 7:
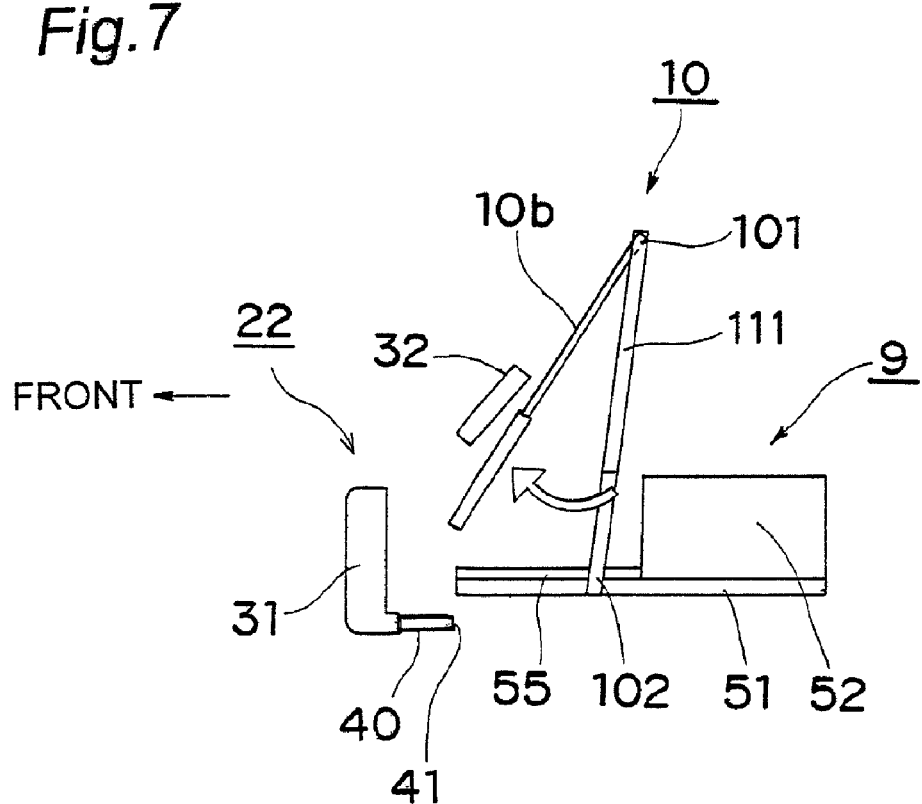
FIG. 7 is a left side view of the portion of screen shield 10 when the 4 passengers transformation is changed to the 2 passengers transformation.

As shown in FIG. 7, the frame members 10b are pulled out from the intermediate portion 511 of the bottom plate 51 and are swung via the hinges 101 so as to be in front of the screen shield frame 111.

Figure 8:
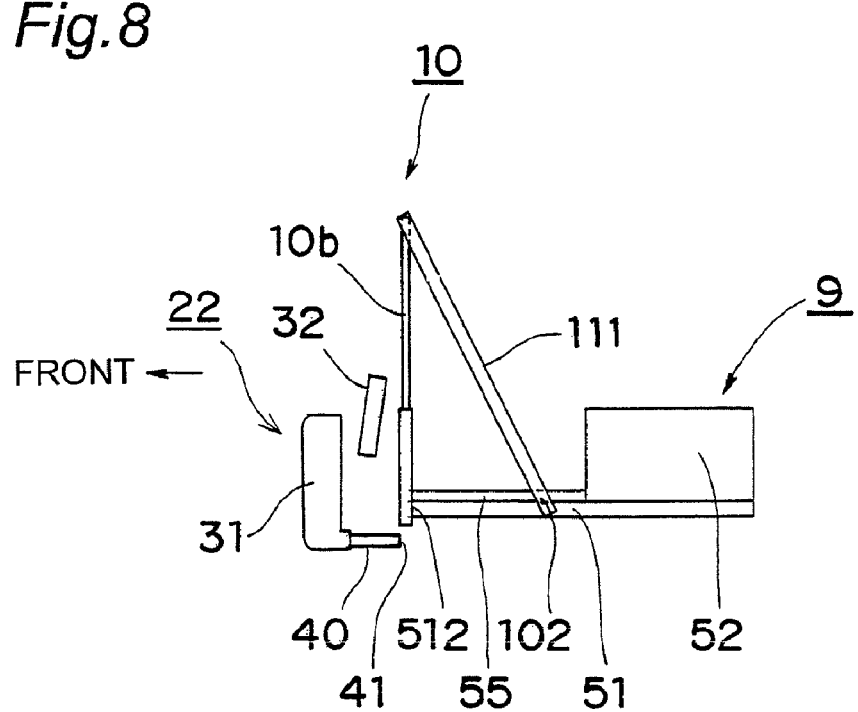
FIG. 8 is a left side view of the portion of screen shield 10 when the 4 passengers transformation is changed to the 2 passengers transformation.

As shown in FIG. 8, the screen shield frame 111 is rotated in a front direction via the hinges 102. The frame members 10b are inserted into and fixed to the front portion 512 of the bottom plate 51.

Figure 9:
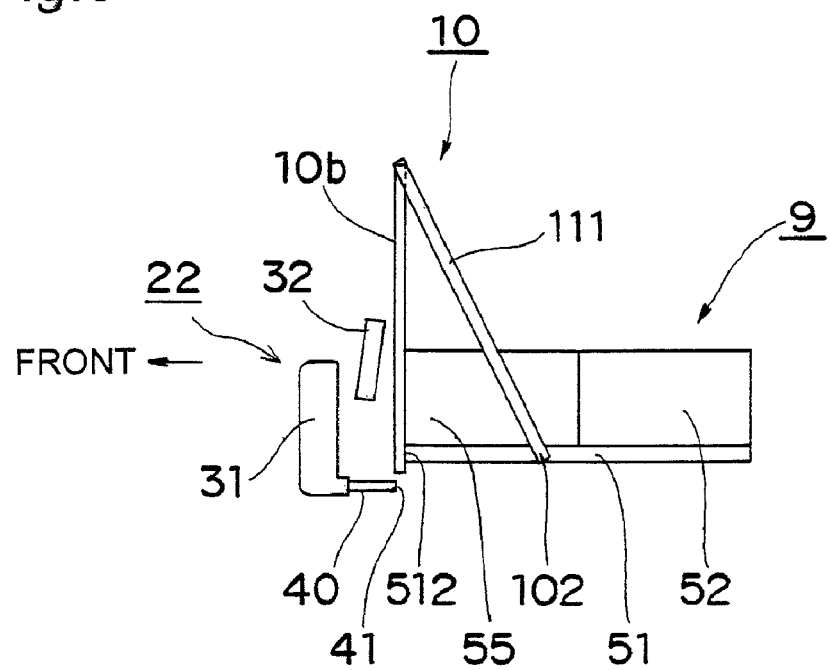
FIG. 9 is a left side view of the portion of screen shield 10 when the 4 passengers transformation is changed to the 2 passengers transformation.

As shown in FIG. 9, pair of right and left expandable side panels 55 folded inward are erected left or right to form the side panels in front of the stationary side panels 52.

As described above, in this embodiment, it is not necessary to lift and move the screen shield 10. The operation of changing the 4 passengers transformation to the 2 passengers transformation can be easily performed by one person.

When the 2 passengers transformation shown in FIG. 3 is changed to the 4 passengers transformation shown in FIG. 2 so that the cargo bed 9 becomes in the non-expanded state, the expanding operation may be reversed. It is not necessary to lift and move the screen shield 10. Also in this case, the operation of changing the 2 passengers transformation to the 4 passengers transformation can be easily performed by one person.

To stably move the frame members 10b, stoppers and the like are preferably provided in the hinges 102 so as to define the rotation range of the screen shield frame 111.

The length in an up-down direction of the frame members 10b is expandable and contractable. Therefore, the protrusion portion 10b1 of the frame members 10b is easily inserted into or pulled out from the intermediate portion 511 or the front portion 512 of the bottom plate 51. Various means for making the length in an up-down direction of the frame members 10b expandable and contractable are contemplated, for example, the frame members 10b may have a spring. The protrusion portion 10b1 is formed to have the length in an up-down direction so as not to cause a gap between the frame members 10b and the bottom plate 51. A load loaded on the cargo bed 9 cannot enter into the riding space from the gap between the frame members 10b and the bottom plate 51.

Second Embodiment

Figure 10:
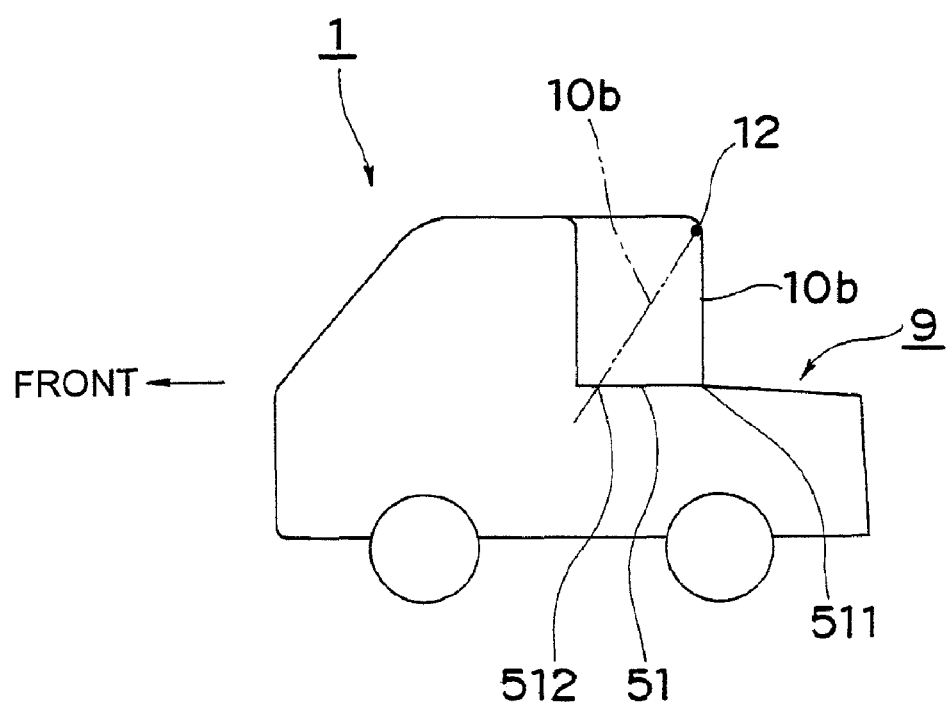
FIG. 10 is a left side schematic diagram of the pick-up style utility vehicle according to a second embodiment of the present invention.

FIG. 10 is a second embodiment of the present invention and is a left side schematic diagram of the pick-up style utility vehicle. The second embodiment has the same configuration as that of the first embodiment except that the following configuration (a) is different. Like components are indicated by like reference numerals.

(a) As shown in FIG. 10, in the second embodiment, the pick-up style utility vehicle does not have the screen shield frame 111. The frame members 10b are swingably supported on the cross frame members 12 in the upper portion of the cabin frame 7. The lower portions of the frame members 10b are inserted into the bottom plate 51 to fix the frame members 10b. The frame members 10b are inserted into the portion 511 of the bottom plate 51 in the 4 passengers transformation and are inserted into the portion 512 of the bottom plate 51 in the 2 passengers transformation. When the frame members 10b are inserted to the portion 511 or 512, the frame members 10b can be inserted into the portion 511 or 512 so as to be moved in a front-rear direction.

Figure 11:
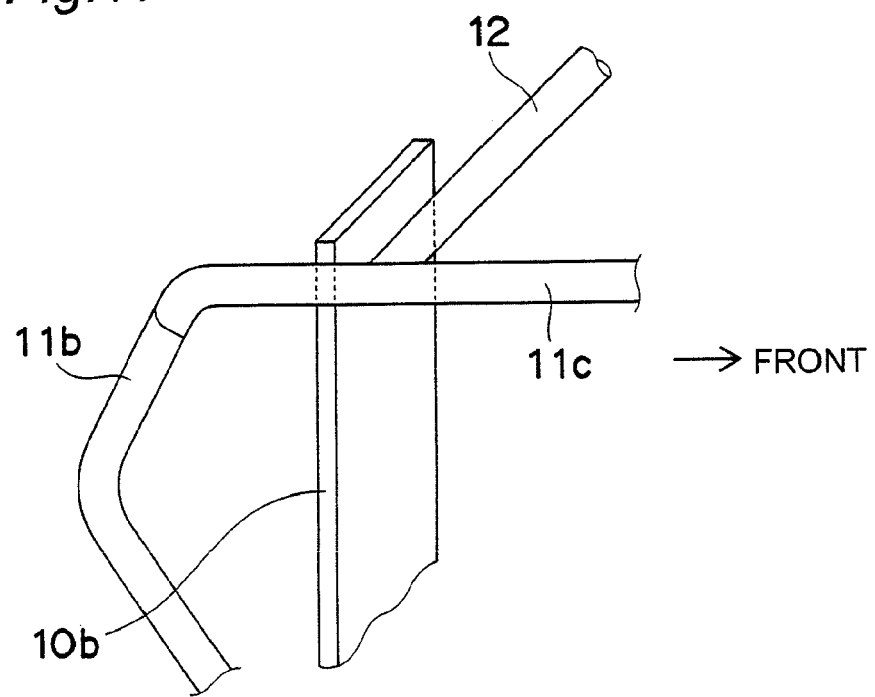
FIG. 11 is a schematic diagram of a portion in which the frame member 10b is fixed to the cross frame member 12.
Figure 12:
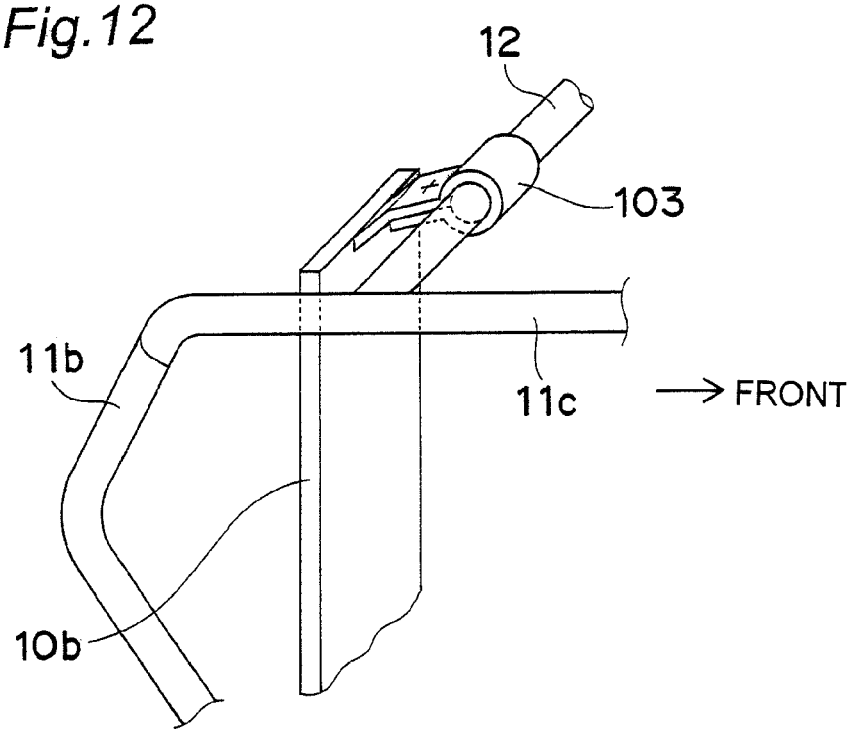
FIG. 12 is a schematic diagram of a portion in which frame member 10b is fixed to cross frame member 12.
Figure 13:
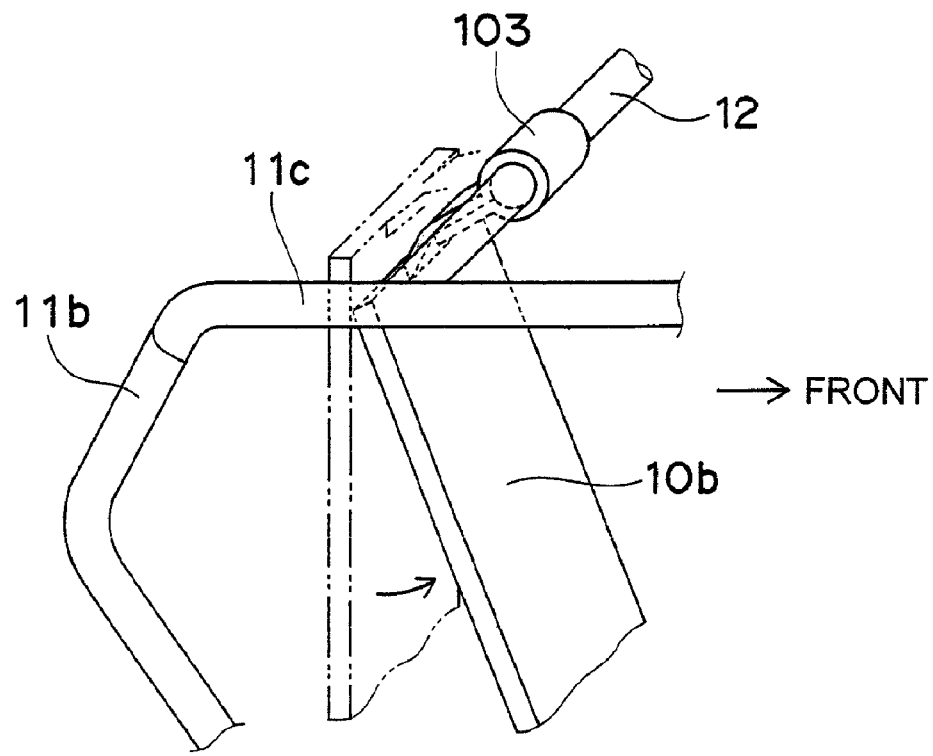
FIG. 13 is a schematic diagram of a portion in which frame member 10b is fixed to cross frame member 12.
Figure 14:
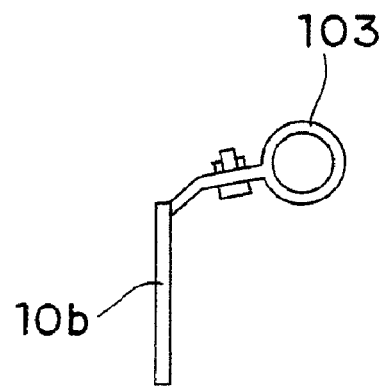
FIG. 14 is a schematic diagram of a holding member.

FIGS. 11 to 14 show schematic diagrams of a portion in which the frame member 10b is fixed to the cross frame member 12. FIG. 11 shows the frame member 10b to which a holding member is not attached. FIG. 12 shows a state that the frame member 10b is attached to the cross frame member 12 by the holding member 103 and is located in the position in the 4 passengers transformation. FIG. 13 shows a state that the frame member 10b is attached to the cross frame member 12 by the holding member 103 and that the 4 passengers transformation is changed to the 2 passengers transformation. One or more holding members 103 are attached to the upper end of the frame member 10b in a vehicle width direction (only one of them is shown in FIGS. 12 and 13). When the holding member 103 holds the cross frame member 12, the frame member 10b is swingably supported by the cross frame member 12. FIG. 14 shows an example of the holding member 103 and the holding member 103 is a clamp.

According to the second embodiment, the pick-up style utility vehicle does not have the screen shield frame 111 according to the first embodiment so that the vehicle body frame can be lighter in weight. Since the upper portions of the frame members 10b are supported by the cross frame members 12 and the lower portions of the frame members 10b are supported by the bottom plate 51, the screen shield 10 can be supported more stably. The frame member 10b is attached to the cross frame member 12 by the holding member 103. Thus, the attaching configuration of the frame member 10b can be easily formed.

According to the second embodiment, the frame members 10b are supported by the cross frame members 12. However, the frame members 10b may be supported by the upper portion of the cabin frame such as the upper side portions 11c of the side frame members 11.

Third Embodiment

Figure 15:
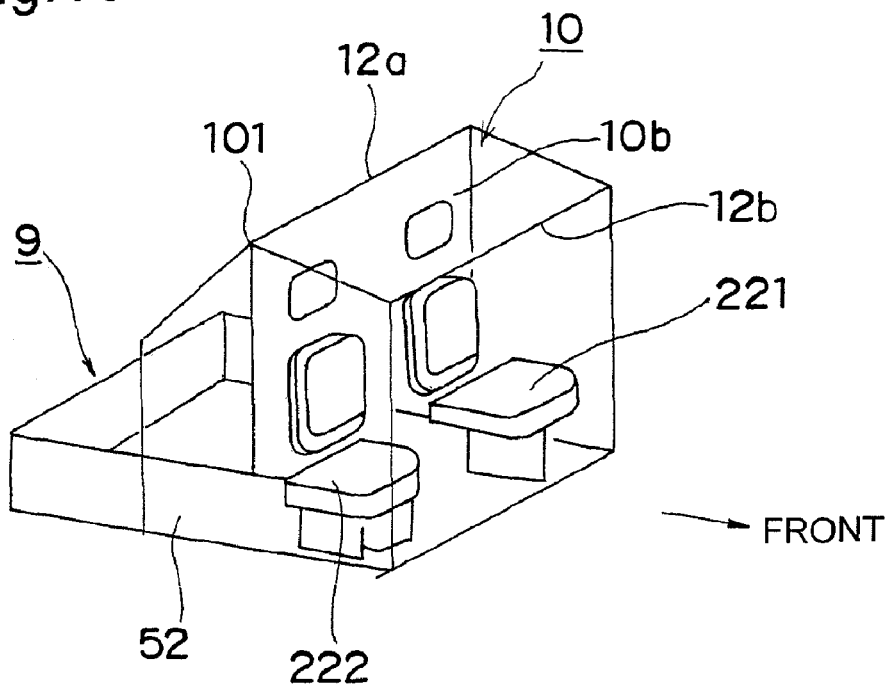
FIG. 15 is a right perspective view of expandable cargo bed 9 and screen shield 10 in the 4 passengers transformation of the pick-up style utility vehicle according to a third embodiment of the present invention.
Figure 16:
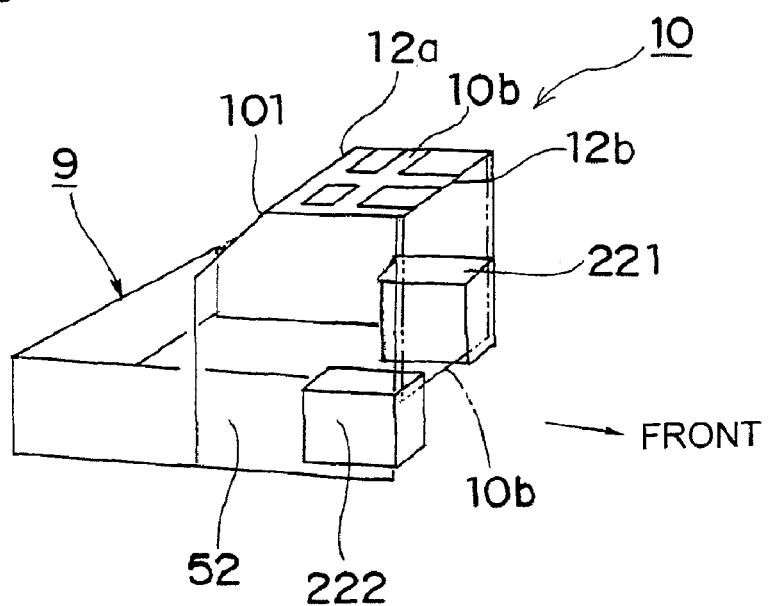
FIG. 16 is a right perspective view of expandable cargo bed 9 and screen shield 10 in the 2 passengers transformation of the pick-up style utility vehicle according to the third embodiment of the present invention.

FIGS. 15 and 16 are a third embodiment of the present invention. FIG. 15 is a right perspective view of the expandable cargo bed 9 and the screen shield 10 in the 4 passengers transformation. FIG. 16 is a right perspective view of the expandable cargo bed 9 and the screen shield 10 in the 2 passengers transformation. The third embodiment has the same configuration as that of the second embodiment except that the following configurations (b) and (c) are different. Like components are indicated by like reference numerals.

(b) As shown in FIG. 15, the upper portions of the frame members 10b of the screen shield 10 are swingably supported by a first cross frame member 12a in the cross frame members 12 via the hinges 101. As shown in FIG. 16, in the 2 passengers transformation, the frame members 10b are rotated in a front direction via the hinges 101 and the lower portions of the frame members 10b are fixed to a second cross frame member 12b in the cross frame members 12. The second cross frame member 12b is located in front of the first cross frame member 12a supporting the upper portions of the frame members 10b. As shown in FIG. 16, the frame members 10b cover the upper portion of the pick-up style utility vehicle.

Frame members 10b can be attached to or detached from the first cross frame members 12a. Frame members 10b are swingably supported by the second cross frame members 12b. Accordingly, as indicated by the imaginary line of FIG. 16, the frame members 10b are supported so as to be suspended from the second cross frame members 12b. That is, the frame members 10b become the screen shield in the 2 passengers transformation.

(c) As shown in FIGS. 15 and 16, the rear seat 22 is divided into a rear left seat 221 and a rear right seat 222. They are erected in front of the stationary side panels 52 to form the side panels of the expandable portions of cargo bed 9.

According to the third embodiment, the screen shield 10 can have a function, not only of the screen shield in the 2 passengers transformation, but also of the roof of the pick-up style utility vehicle, and can shield a human and a load in the pick-up style utility vehicle from sunlight and rain. When the cargo bed 9 is expanded, the rear seat 22 forms the expandable side panels. Thus, the expandable side panels 55 according to the first embodiment can be unnecessary.

According to the third embodiment, the frame members 10b can be attached to and detached from the first cross frame member 12a and the second cross frame member 12b and is swingably supported by the first cross frame member 12a and the second cross frame member 12b. The frame members 10b may be attachable to or detachable from the upper portion of the cabin frame such as the upper side portions 11c of the side frame members 11 and be swingably supported by it.

Fourth Embodiment

Figure 17:
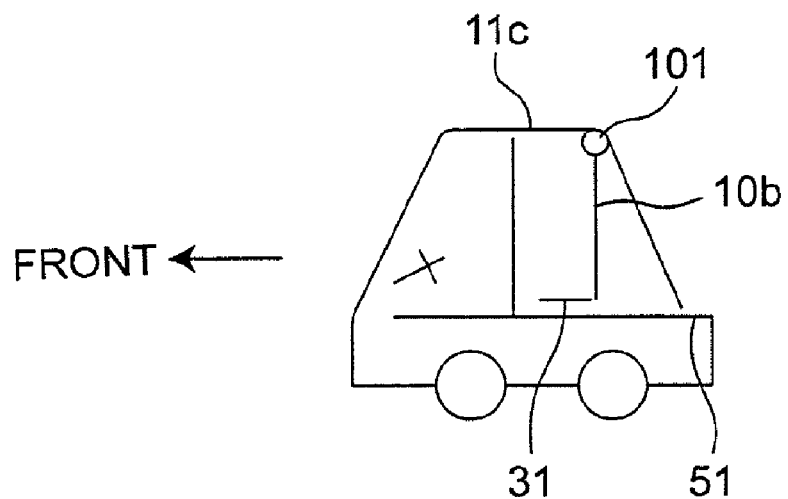
FIG. 17 is a left side schematic diagram of the 4 passengers transformation of the pick-up style utility vehicle according to a fourth embodiment of the present invention.
Figure 18:
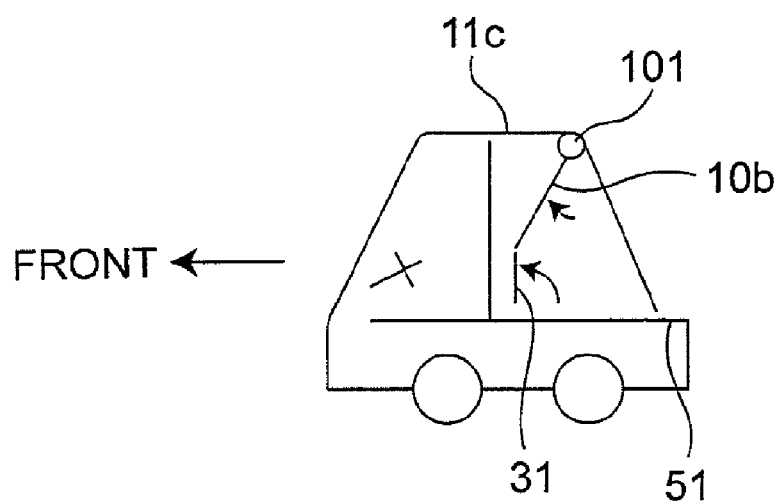
FIG. 18 is a left side schematic diagram of the 2 passengers transformation of the pick-up style utility vehicle according to the fourth embodiment of the present invention.

FIGS. 17 and 18 are a fourth embodiment of the present invention. FIG. 17 is a left side schematic diagram of the 4 passengers transformation. FIG. 18 is a left side schematic diagram of the 2 passengers transformation. The fourth embodiment has the same configuration as that of the second embodiment except that the following configuration (d) is different. Like components are indicated by like reference numerals.

(d) As shown in FIG. 17, in the 4 passengers transformation, the upper portions of the frame members 10b of the screen shield 10 are rotatably supported via the hinges 101 attached to the side frame members 11 and the lower portions of the frame members 10b are inserted into the bottom plate 51. As shown in FIG. 18, in the 2 passengers transformation, the frame members 10b are rotated via the hinges 101 and are tilted downward in a front direction. The lower portions of the frame members 10b are fixed to the seat bottom 31. In detail, when the rear seat 22 is folded and the seat bottom 31 becomes in a substantially vertical state, the lower portions of the frame members 10b are attached to the upper end of the seat bottom 31. The hinges 101 can be moved in a front direction along the upper side portions 11c of the side frame members 11, which is preferable because the lower portions of the frame members 10b are easily attached to and detached from the seat bottom 31.

According to the fourth embodiment, the length in an up-down direction of the frame members 10b of the screen shield 10 can be shortened. The weight of the screen shield 10 can be reduced. As a result, the moving operation of the screen shield 10 can be performed more easily.

Fifth Embodiment

Figure 19:
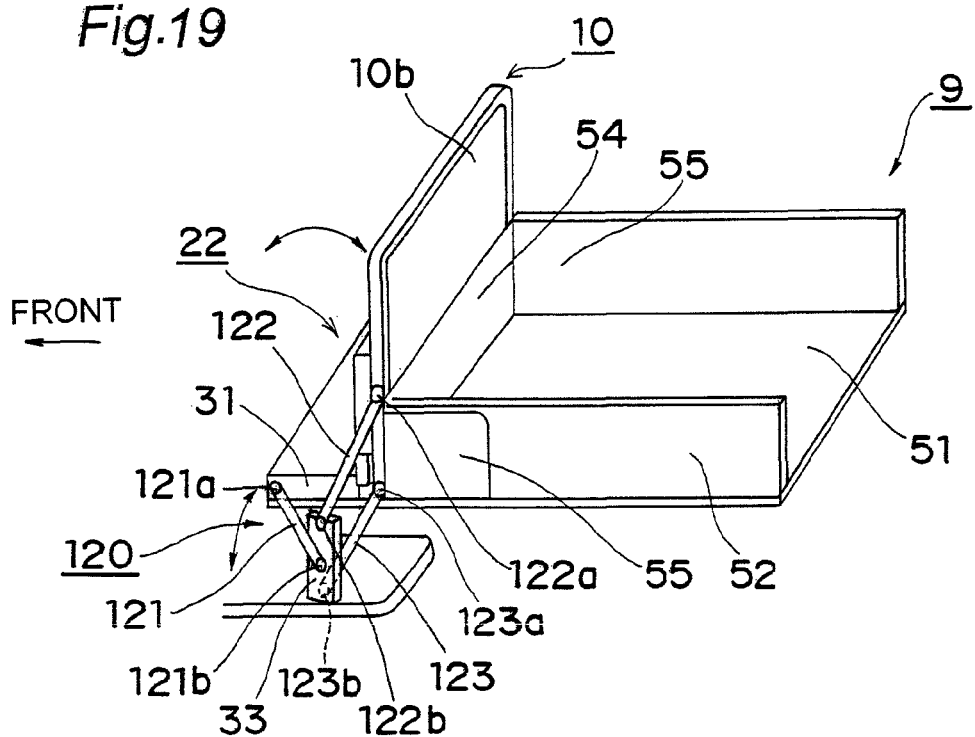
FIG. 19 is a left perspective view of expandable cargo bed 9 and screen shield 10 in the 4 passengers transformation of the pick-up style utility vehicle according to a fifth embodiment of the present invention.
Figure 20:
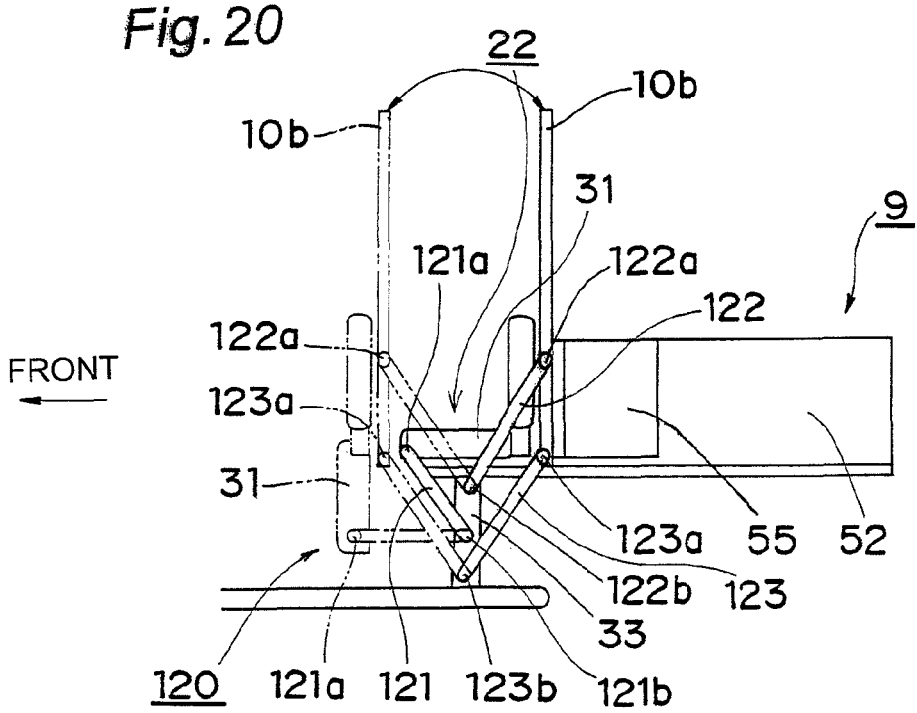
FIG. 20 is a left side view of expandable cargo bed 9 and screen shield 10 of the pick-up style utility vehicle according to the fifth embodiment of the present invention when the 4 passengers transformation is changed to the 2 passengers transformation.
Figure 21:
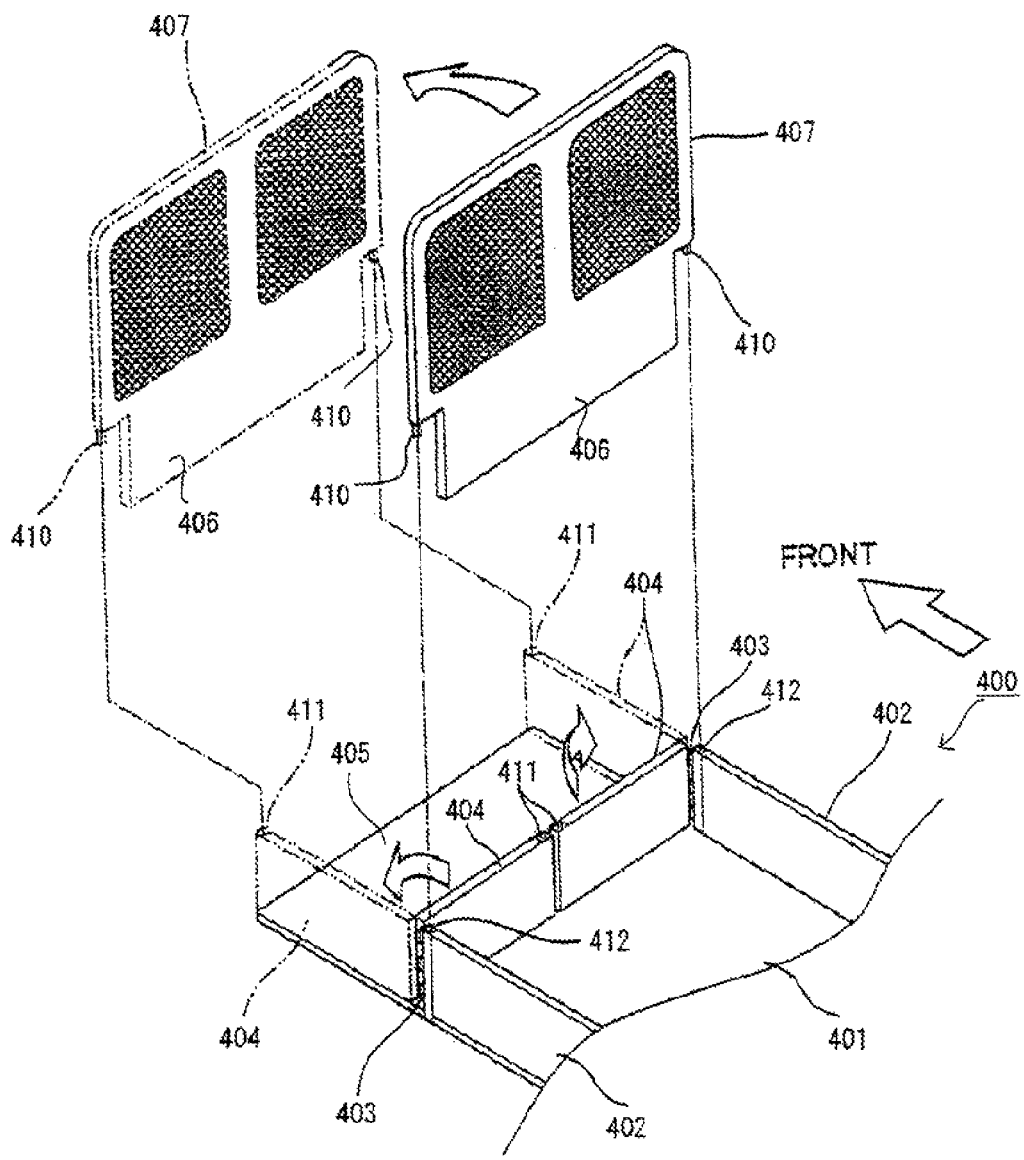
FIG. 21 is a perspective view of a cargo bed and a screen shield of the related art.

FIGS. 19 and 20 are a fifth embodiment of the present invention. FIG. 19 is a left perspective view of the cargo bed 9 and the screen shield 10 in the 4 passengers transformation. FIG. 20 is a left side view of the cargo bed 9 and the screen shield 10 when the 4 passengers transformation is changed to the 2 passengers transformation. The fifth embodiment has the same configuration as that of the second embodiment except that the following configurations (e) and (f) are different. Like components are indicated by like reference numerals.

(e) As shown in FIGS. 19 and 20, the frame members 10b of the screen shield 10 can be moved in a vertical state and in a front-rear direction by a link mechanisms 120. Each of the link mechanisms 120 has three arms 121, 122, and 123 on each of the right and left side surfaces of the pick-up style utility vehicle 1. The arms 121 couple the seat bottom 31 and the side surface center portions of bases 33 supporting the rear seat 22. The arms 122 couple the side surface upper portions of the bases 33 and the side surface center portions of the frame members 10b. The arms 123 couple the side surface lower portions of the bases 33 and the side surface lower portions of the frame members 10b.

The seat bottom 31 and the arms 121 are rotatably coupled via fulcrums 121a. The fulcrums 121a are provided outward in a vehicle width direction of the seat bottom 31. The arms 121 are rotatably coupled about fulcrums 121b. The fulcrums 121b are provided outward in a vehicle width direction of the bases 33. In the 4 passengers transformation, the arms 121 tilted downward in a rear direction couple the seat bottom 31 and the bases 33.

The frame members 10b and the arms 122 are rotatably coupled via the fulcrums 122a. The arms 122 are rotatably coupled to the bases 33 about the fulcrums 122b. The fulcrums 122b are provided above the fulcrums 121b outward in a vehicle width direction of the bases 33. In the 4 passengers transformation, the arms 122 tilted downward in a front direction couple the frame members 10b and the bases 33. The frame members 10b and the arms 123 are rotatably coupled via the fulcrums 123a. The arms 123 are rotatably coupled to the bases 33 about the fulcrums 123b. The fulcrums 123b are provided below the fulcrums 121b inward in a vehicle width direction of the bases 33. In the 4 passengers transformation, the arms 123 tilted downward in a front direction couple the frame members 10b and the bases 33.

When the 4 passengers transformation is changed to the 2 passengers transformation, the link mechanisms 120 are operated as follows.

When the 4 passengers transformation is changed to the 2 passengers transformation, the seat bottom 31 is rotated via the fulcrums 121a so as to become in a substantially vertical state. The arms 121 become in a substantially horizontal state. The arms 122 are rotated in a front direction about the fulcrums 122b and are tilted downward in a rear direction. The arms 123 are rotated in a front direction about the fulcrums 123b and are tilted downward in a rear direction. As indicated by the imaginary line of FIG. 20, the frame members 10b are moved in a front direction while maintaining the substantially vertical state so that the upper ends of the frame members 10b are arced.

When the 2 passengers transformation is changed to the 4 passengers transformation, the link mechanisms 120 perform an operation reversing the above operation and the frame members 10b are thus moved in a rear direction.

(f) The cargo bed 9 has a front panel 54 which can adjust its position in a front-rear direction, and a pair of right and left expandable side panels 55 for expanding the cargo bed 9 in a front direction. The pair of expandable side panels 55 are arranged outward in a vehicle width direction of the stationary side panels 52. The front panel 54 is attached to the front ends of the expandable side panels 55. The expandable side panels 55 and the front panel 54 are provided so as to be slidable in a front-rear direction. The front panel 54 is attached to the frame members 10b of the screen shield 10. Thus, the front panel 54 and the expandable side panels 55 are moved in a front-rear direction according to the movement in a front-rear direction of the frame members 10b. In order that the cargo bed 9 becomes in the expanded state, the frame members 10b of the screen shield 10 are moved in a front direction by the link mechanisms 120. The front panel 54 attached to the frame members 10b is moved in a front direction. By the movement of the front panel 54 in a front direction, the expandable side panels 55 attached to the front panel 54 are slid in a front direction so that the rear ends thereof are located at the front ends of the stationary side panels 52 and the cargo bed 9 becomes in the expanded state. In order that the cargo bed 9 becomes in the non-expanded state, the frame members 10b of the screen shield 10 are moved in a rear direction by the link mechanisms 120. Accordingly, the front panel 54 attached to the frame members 10b is moved in a rear direction. By the movement of the front panel 54 in a rear direction, the expandable side panels 55 attached to the front panel 54 are slid in a rear direction so that the front ends thereof are located at the front ends of the stationary side panels 52 and the cargo bed 9 becomes in the non-expanded state.

According to the fifth embodiment, the seat bottom 31 of the rear seat 22 is rotated so as to become in a substantially vertical state. Therefore, the cargo bed 9 is automatically expanded in a front direction via the link mechanisms 120, while the frame members 10b of the screen shield 10 are moved in a front direction. Thus, the movement of the screen shield 10 can be easily performed. When the cargo bed 9 is in the non-expanded state, the above operation may be reversed. Also in this case, the seat bottom 31 is rotated so as to become in a substantially horizontal state so that the cargo bed 9 automatically becomes in the non-expanded state via the link mechanisms 120. The frame members 10b of the screen shield 10 are moved in a rear direction. Therefore, the moving operation of the screen shield 10 can be easily performed. The frame members 10b of the screen shield 10 are coupled to the bases 33 of the seat bottom 31 by the link mechanisms 120 and are slid and moved in a front-rear direction. In the 4 passengers transformation and the 2 passengers transformation, the fixing means for the fixing frame members 10b can be unnecessary.

Other Embodiments (1) The fixing mechanism for fixing the screen shield 10 in the 4 passengers transformation and the 2 passengers transformation is not limited to the insertion type, the pin type, and the clamp type of FIG. 14. Various fixing means such as a bolt type and a magnet type can be used.

(2) The present invention is not limited to the configurations of the above embodiments and includes various modification examples contemplated in the scope without departing from the contents described in the scope of the claims.

What is claimed is:
1. A pick-up style utility vehicle comprising:
a front seat;
a rear seat; and
a cargo bed in this order from a front of the vehicle;
a cabin frame surrounding a riding space; and
a screen shield partitioning the cargo bed and a rear riding space in front of the cargo bed, wherein:
the cargo bed can be changed between an expanded state in which the cargo bed is expanded in a front direction into rear riding space and a non-expanded state not occupying the rear riding space,
the screen shield is directly or indirectly supported by a swinging shaft provided on a vehicle body and is swingable between a position in the expanded state and a position in the non-expanded state,
the screen shield is directly or indirectly coupled to the rear seat via a link mechanism,
the rear seat is rotatable so that the rear seat is in a substantially horizontal state in the non-expanded state of the cargo bed and the rear seat is in a substantially vertical state in the expanded state of the cargo bed, and
when the rear seat is shifted between the substantially horizontal state and the substantially vertical state, the screen shield is swingable in a front-rear direction by the link mechanism.

* * * * *